United States Patent
Zhao et al.

(10) Patent No.: US 9,246,679 B2
(45) Date of Patent: Jan. 26, 2016

(54) APPARATUS AND METHOD FOR NEGOTIATING PAIRWISE MASTER KEY FOR SECURING PEER LINKS IN WIRELESS MESH NETWORKS

(75) Inventors: Meiyuan Zhao, Santa Clara, CA (US); Jesse Walker, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 1481 days.

(21) Appl. No.: 11/966,776

(22) Filed: Dec. 28, 2007

(65) Prior Publication Data

US 2009/0169011 A1 Jul. 2, 2009

(51) Int. Cl.
| | |
|---|---|
| *H04L 9/32* | (2006.01) |
| *G06G 7/48* | (2006.01) |
| *C12P 5/02* | (2006.01) |
| *H04L 9/08* | (2006.01) |
| *H04W 12/04* | (2009.01) |
| *H04B 5/00* | (2006.01) |
| *H04L 29/06* | (2006.01) |
| *H04W 12/06* | (2009.01) |
| *H04W 84/18* | (2009.01) |

(52) U.S. Cl.
CPC .......... *H04L 9/0844* (2013.01); *H04W 12/04* (2013.01); *H04B 5/0031* (2013.01); *H04L 63/162* (2013.01); *H04L 2209/80* (2013.01); *H04W 12/06* (2013.01); *H04W 84/18* (2013.01)

(58) Field of Classification Search
CPC ..... H04L 63/068; H04L 63/162; G06F 21/31; G06F 21/33; G06F 21/57; G06F 2221/2141; G06Q 20/3674; H04W 12/06; H04B 5/0031

USPC .......................................... 380/270; 713/171
See application file for complete search history.

(56) References Cited

U.S. PATENT DOCUMENTS

| | | | | |
|---|---|---|---|---|
| 5,781,862 | A * | 7/1998 | Da Silva et al. | 455/436 |
| 7,221,750 | B2 * | 5/2007 | Brahmbhatt et al. | 379/201.06 |
| 7,234,058 | B1 * | 6/2007 | Baugher et al. | 713/163 |
| 7,333,464 | B2 * | 2/2008 | Yang et al. | 370/338 |
| 7,350,233 | B1 * | 3/2008 | Lee et al. | 726/15 |
| 7,421,268 | B2 * | 9/2008 | Lee et al. | 455/411 |
| 7,602,918 | B2 * | 10/2009 | Mizikovsky et al. | 380/270 |

(Continued)

FOREIGN PATENT DOCUMENTS

| | | |
|---|---|---|
| KR | 10-2006-0042045 A | 5/2006 |
| KR | 10-2006-0088806 A | 8/2006 |

OTHER PUBLICATIONS

International Search Report and Written Opinion issued on Jun. 22, 2009 in International Application No. PCT/US2008/085110.

(Continued)

*Primary Examiner* — Arvin Eskandarnia
*Assistant Examiner* — Margishi Desai
(74) *Attorney, Agent, or Firm* — Pillsbury Winthrop Shaw Pittman LLP (57) ABSTRACT

A system and method for negotiating a pairwise master key ("PMK") in wireless mesh networks. The system includes a plurality of mesh points that are configured to perform an abbreviated handshake protocol in negotiating a PMK and establishing a secure connection. The method for establishing a negotiated PMK is based on selecting a PMK before transmitting any data, and arranging available PMKs in a predetermined list so that a PMK can be negotiated in a limited number of exchanges.

21 Claims, 6 Drawing Sheets

(56) References Cited

U.S. PATENT DOCUMENTS

| | | | | |
|---|---|---|---|---|
| 7,706,800 | B2* | 4/2010 | Sharaga | 455/439 |
| 7,804,807 | B2* | 9/2010 | Korus et al. | 370/338 |
| 7,978,855 | B2* | 7/2011 | Cho | H04L 9/0825 380/270 |
| 8,594,315 | B1* | 11/2013 | Daily et al. | 379/355.05 |
| 2003/0219129 | A1* | 11/2003 | Whelan et al. | 380/270 |
| 2004/0242228 | A1* | 12/2004 | Lee et al. | 455/432.1 |
| 2006/0048213 | A1* | 3/2006 | Cheng et al. | 726/5 |
| 2006/0083377 | A1* | 4/2006 | Ptasinski | 380/270 |
| 2006/0126845 | A1 | 6/2006 | Zheng | |
| 2006/0168445 | A1* | 7/2006 | Pitsos | 713/162 |
| 2006/0187878 | A1* | 8/2006 | Calhoun et al. | 370/331 |
| 2006/0251256 | A1 | 11/2006 | Asokan et al. | |
| 2007/0005973 | A1* | 1/2007 | Mynam et al. | 713/171 |
| 2007/0016780 | A1* | 1/2007 | Lee | H04L 63/061 713/171 |
| 2007/0110009 | A1* | 5/2007 | Bachmann et al. | 370/338 |
| 2007/0165858 | A1* | 7/2007 | Bakshi | 380/247 |
| 2007/0171910 | A1* | 7/2007 | Kumar | 370/392 |
| 2007/0198286 | A1* | 8/2007 | Tomita | 705/1 |
| 2007/0206537 | A1* | 9/2007 | Cam-Winget et al. | 370/331 |
| 2007/0280169 | A1* | 12/2007 | Cam Winget | 370/331 |
| 2008/0016350 | A1* | 1/2008 | Braskich et al. | 713/169 |
| 2008/0031155 | A1* | 2/2008 | Korus et al. | 370/254 |
| 2008/0051060 | A1* | 2/2008 | Lee et al. | 455/411 |
| 2008/0065888 | A1* | 3/2008 | Zheng | H04L 9/0844 713/171 |
| 2008/0104391 | A1* | 5/2008 | Fukuta et al. | 713/153 |
| 2008/0198769 | A1* | 8/2008 | Tzeng | 370/256 |
| 2008/0226071 | A1* | 9/2008 | Braskich et al. | 380/258 |
| 2012/0189124 | A1* | 7/2012 | Wang et al. | 380/270 |

OTHER PUBLICATIONS

International Preliminary Report on Patentability in related application No. PCT/US2008/085110 dated Jul. 8, 2010.

State Intellectual Property Office, P.R. China, Office Action, Patent Application No. 200880123657.X, mail date, Jan. 22, 2013, total of 11 pages.

* cited by examiner

APPARATUS AND METHOD FOR NEGOTIATING PAIRWISE MASTER KEY FOR SECURING PEER LINKS IN WIRELESS MESH NETWORKS

FIELD OF INVENTION

The embodiments of the invention generally relate to wireless networks. Specifically, the embodiments of the invention relate to an apparatus and a method for an authentication protocol in wireless ad-hoc networks.

BACKGROUND OF THE INVENTION

Recently, there has been a shift towards wireless technologies resulting in a surge of wireless products. Wireless versions exist for nearly all products. An area of wireless technology that has seen significant growth over the past decade is wireless networking, and more specifically wireless local area networks ("WLAN"). Wireless networks are becoming more prevalent, and are available nearly everywhere. Cities are deploying city-wide wireless networks, wireless connectivity is available in businesses, homes, libraries, airports, and even coffee shops. The benefits of wireless networks are undeniable. They are extremely convenient, providing increased mobility and efficiency. Furthermore, wireless networks are easy to expand, and easy to deploy. However, despite all the benefits of wireless networks, issues of security, range, arid speed exist with WLANs.

The IEEE 802.11 protocol is the governing standard for WLANs. As wireless networking technology has developed, the IEEE 802.11 standard has undergone multiple amendments. Each amendment is aimed to address specific shortcomings of wireless networks. These amendments are designated by a letter following "802.11," and have introduced various improvements on the original 802.11 standard. The 802.11b and 802.11g standards are two modulation amendments that are widely used for implementing home wireless networks. The 802.11i standard is an amendment to the 802.11 standard implementing various security mechanisms for wireless networks. The 802.11i standard introduced the WiFi Protected Access2 ("WPA2") protocol, which supplemented the wired equivalent privacy ("WEP") and WiFi Protected Access ("WPA") protocols. WPA2 makes use of the Extensible Authentication Protocol ("EAP") in providing a pairwise master key ("PMK") in establishing a secure link.

Another amendment currently under development to the IEEE 802.11 standard is the 802.11s standard. The 802.11s standard was chartered to improve throughput of data transmission over a wireless network through the addition of mesh capabilities. Mesh capabilities allow data to be transmitted on paths consisting of multiple wireless hops. A primary focus during the development of the 802.11s standard with mesh capabilities was to improve performance for streaming video. However, streaming video limits the time allotted for links to be established, making the establishment of a secure link difficult with existing authentication protocols. Particularly difficult is the negotiation of a PMK for establishing the authenticated peer link during the allotted time.

BRIEF DESCRIPTION OF THE DRAWING FIGURES

The present invention will be more readily understood from the detailed description of exemplary embodiments presented below considered in conjunction with the accompanying drawings, in which.

DETAILED DESCRIPTION OF THE INVENTION

An embodiment of the invention is directed to a system for negotiating a pairwise master key ("PMK"). A PMK is a shared key that allow the encryption and decryption of data transmitted between two network devices. A PMK may have a limited life span, and may also be used to derive pairwise transient keys ("PTK") to perform the actual encryption and decryption of data. PMKs may be used for the entire duration of a connection between two network devices until the connection is terminated or lost. Although authentication protocols utilizing PMKs are generally used in wireless networks, they can be used in the implementation of wired networks as well. Each network device includes a processor, a storage device, a random number generator and a communication device that is able to both receive and transmit data. Furthermore, each network device is configured to select a default PMK before a PMK has been negotiated. The selected default PMK may be the highest priority PMK from a list of available PMKs, where priorities are based on the expiration times of each PMK. Other methods of sorting the list of PMKs may also be used as long as the basis of the arrangement is known to both mesh points establishing the connection. This list of PMKs arranged in order of expiration times is also known as the PMK identifier list. The PMK identifier list is specific between two specific mesh points, and includes a list of the PMKs that are shared between the two specific mesh points and are available for the establishing a connection between the two specific mesh points. The network devices advertise the PMKs that it has available by adding the PMK identifier list to an open message when attempting to form a connection. Each network device is also configured to receive PMK identifiers lists from other network devices and independently select a negotiated PMK, the PMK that will be used by the network devices for the duration of the connection that they establish, using an interpretive algorithm based on the default PMK and the PMK identifier lists it has received and transmitted. After a negotiated PMK has been selected, the network device sends out a confirmation to the network device with which it is establishing a link to complete the protocol. The embodiments of the invention allow the negotiation of the PMK in at least four messages. This is accomplished through the use of an ordered PMK list that ranks the available PMKs according to expiration times of the individual PMKs, thus allowing a network device to select the highest priority PMK as a default PMK to be used in its initial transmission when attempting a connection before a PMK has been negotiated.

The term "handshake" refers to handshaking in information technology, telecommunications, and related fields, wherein handshaking is an automated process of negotiation that dynamically sets parameters of a communications channel established between two entities before normal communication over the channel begins. It follows the physical establishment of the channel and precedes normal information transfer. Handshaking may be used to negotiate parameters that are acceptable to equipment and systems at both ends of the communication channel, including, but not limited to, information transfer rate, coding alphabet, parity, interrupt procedure, and other protocol or hardware features.

Handshaking makes it possible to connect relatively heterogeneous systems or equipment over a communication channel without the need for human intervention to set parameters. One example of handshaking is that of modems, which typically negotiate communication parameters for a brief period when a connection is first established, and thereafter use those parameters to provide optimal information transfer over the channel as a function of its quality and capacity. The "squealing" (which is actually a sound that changes in pitch 100 times every second) noises made by some modems with speaker output immediately after a connection is established are in fact the sounds of modems at both ends engaging in a handshaking procedure; once the procedure is completed, the speaker might be silenced, depending on the driver.

It is a process that takes place when a computer is about to communicate with a device to establish rules for the communication.

Preferably, the network devices are configured to transmit and receive data wirelessly. Preferably, the plurality of network devices are mesh points in a wireless ad-hoc network. Preferably, the open message comprises a network device identifier associated with the network device transmitting the PMK identifier list; a generated random number associated with the network device transmitting the open message; a list of PMKs associated with the network device transmitting the open message; the default PMK associated with the network device transmitting the open message; and a message authentication code constructed with the default PMK. Preferably, the list of PMKs is arranged based on expiration times associated with each of the PMKs in the list. Preferably, the negotiated PMK is selected based on an interpretive algorithm. Preferably, the confirmation message comprises a network device identifier associated with the network device transmitting the confirmation message; a network device identifier associated with the network device receiving the confirmation message; a randomly generated number associated with the network device transmitting the confirmation message; a randomly generated number associated with the network device receiving the confirmation message; the negotiated PMK; and a message authentication code constructed with the negotiated PMK. Preferably, the PMK is selected based on an interpretive algorithm.

An alternative embodiment of the invention is directed to a method for negotiating a pairwise master key ("PMK") between network devices establishing a link. To start the process, a new instance for establishing a link is created at a network device. Then, a default PMK is selected from the PMKs that the network device has available, and the network device constructs a PMK identifier list to advertise available PMKs to other network devices using the selected default PMK. The PMK identifier list includes the PMKs that the network device has available, arranged in order of priority, that it shares with the specific mesh point with which it is trying to establish a connection, and the default PMK is preferably the PMK with the highest priority. The network device then transmits the PMK identifier list to other network devices, and receives a PMK identifier list transmitted by a second network device. Upon receiving the PMK identifier list, the network device selects a negotiated PMK using an interpretive algorithm based on the received PMK identifier list and composes and transmits a confirmation message to the second network device if a PMK has been negotiated. If no PMK is successfully selected, no confirmation messages are constructed or composed and the link instances are discarded.

Preferably, the method comprises the steps of determining a second default PMK associated with the second network device; constructing the second PMK identifier list associated with the second network device; transmitting the second PMK identifier list to the first network device; receiving the first PMK identifier list transmitted by the first network device; independently selecting a second PMK based on the received first PMK identifier list; composing the second confirmation message based on the selected second PMK; and transmitting the second confirmation message to the first network device. Preferably, the transmitting steps are performed wirelessly. Preferably, the first network device and the second network device are mesh points of a wireless ad-hoc network.

Another embodiment of the invention is directed to a method for negotiating a pairwise master key between two network devices. In this embodiment, both network devices create new instances for establishing a link, and select default PMKs from the PMKs that each network device has available. The network devices use these PMKs and the PMKs that it has available to compose PMK identifier list messages, and transmit the PMK identifier list messages to each other. After both network devices have received the PMK identifier lists, each network device selects a PMK. After the PMKs have been selected, each network device composes and transmits a confirmation message to the other. If no PMK is successfully selected, no confirmation messages are constructed or composed and the link instances are discarded.

Figure 1:
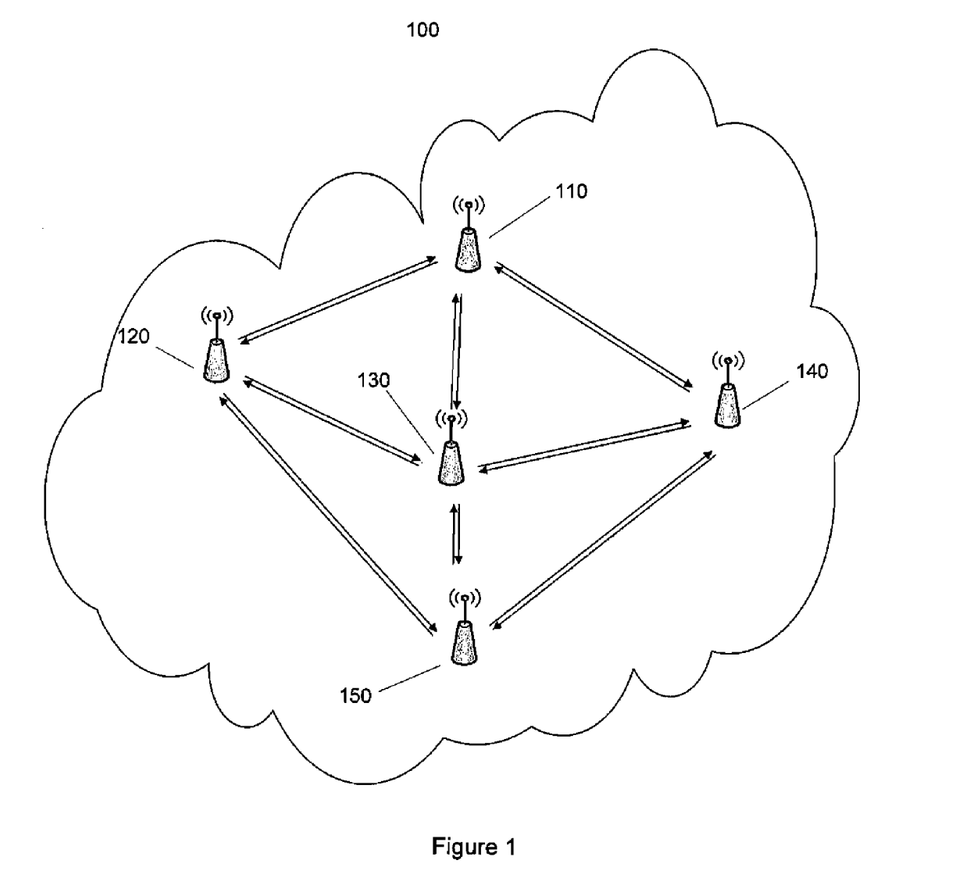
FIG. 1 is an illustration of a wireless ad-hoc local area network according to an embodiment of the invention.

FIG. 1 is an exemplary illustration of a wireless ad-hoc network according to an embodiment of the invention. Although the wireless network 100 depicted in FIG. 1 is shown with five mesh points, mesh points 110, 120, 130, 140, and 150, the wireless network 100 may have any number of wireless mesh points. Furthermore, the mesh points 110, 120, 130, 140, and 150 may be any type of wireless node or network appliance such as a laptop computer, a personal computer, a wireless access points, etc. The illustration of FIG. 1 depicts a general wireless network, and since the design of wireless mesh networks will vary widely depending on the application and implementation of the network, FIG. 1 does not include features of wireless mesh networks that may be present in other implementations of wireless mesh networks. Furthermore, although the invention may be described through exemplary embodiments of the invention, the features of the invention may be implemented in nearly all wireless mesh networks, and an embodiment of the invention has been accepted in the draft for the IEEE 802.11s standard.

Figure 2:
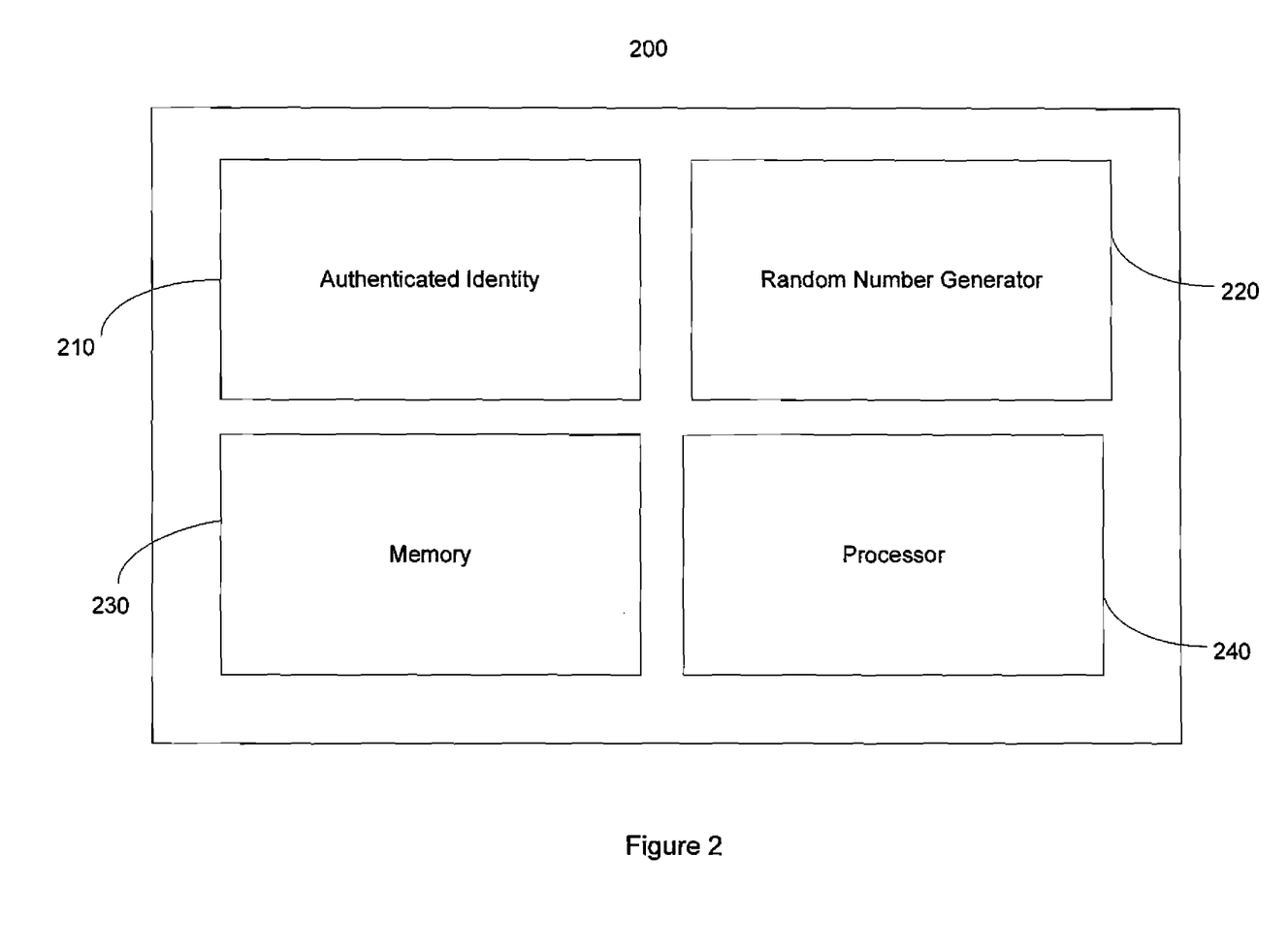
FIG. 2 is an exemplary block diagram of a mesh point according to an embodiment of the invention.

FIG. 2 is a representative block diagram of a mesh point 200 that may be used in an embodiment of the invention. The block diagram of the mesh point 200 of FIG. 2 may be representative of any of the mesh points 110, 120, 130, 140 or 150 shown in FIG. 1. The mesh point 200 may be nearly any type of wireless network appliance, including a laptop computer, a personal computer ("PC"), a personal data assistant ("PDA"), a wireless access point, etc. FIG. 2 shows various basic components that the mesh point 200 may include. The mesh point 200 may include an authenticated identity 210. The authenticated identity 210 may be the media access control ("MAC") address of the mesh point 200, or any other unique identifier for the mesh point 200. The mesh point 200 may also include a random number generator 220. The random number generator 220 may be a software application that is part of an operating system for the mesh point 200, or the random number generator 200 may be a separate specific standalone application. The random number generator 220 may conform to the ANSI X9.31 and ANSI X9.82 standards in generating random numbers. The mesh point 200 may also include a memory 230. The memory 230 may be a hard drive, a cache memory, or any type of solid state memory, etc. The memory 230 stores any data the mesh point 200 may use in establishing a link with any other mesh point in a mesh network, or performing any other task the mesh point may perform. The data stored in the memory 230 may include a PMK identifier list, a list of PMKs that are available to the mesh point 200, any PMK being used for any existing links, any authentication keys corresponding to any PMKs being used, etc. The mesh point 200 may also include a processor 240. The processor 240 may be any type of device that is designed to carry out the functions of the mesh point 200.

Figure 3:
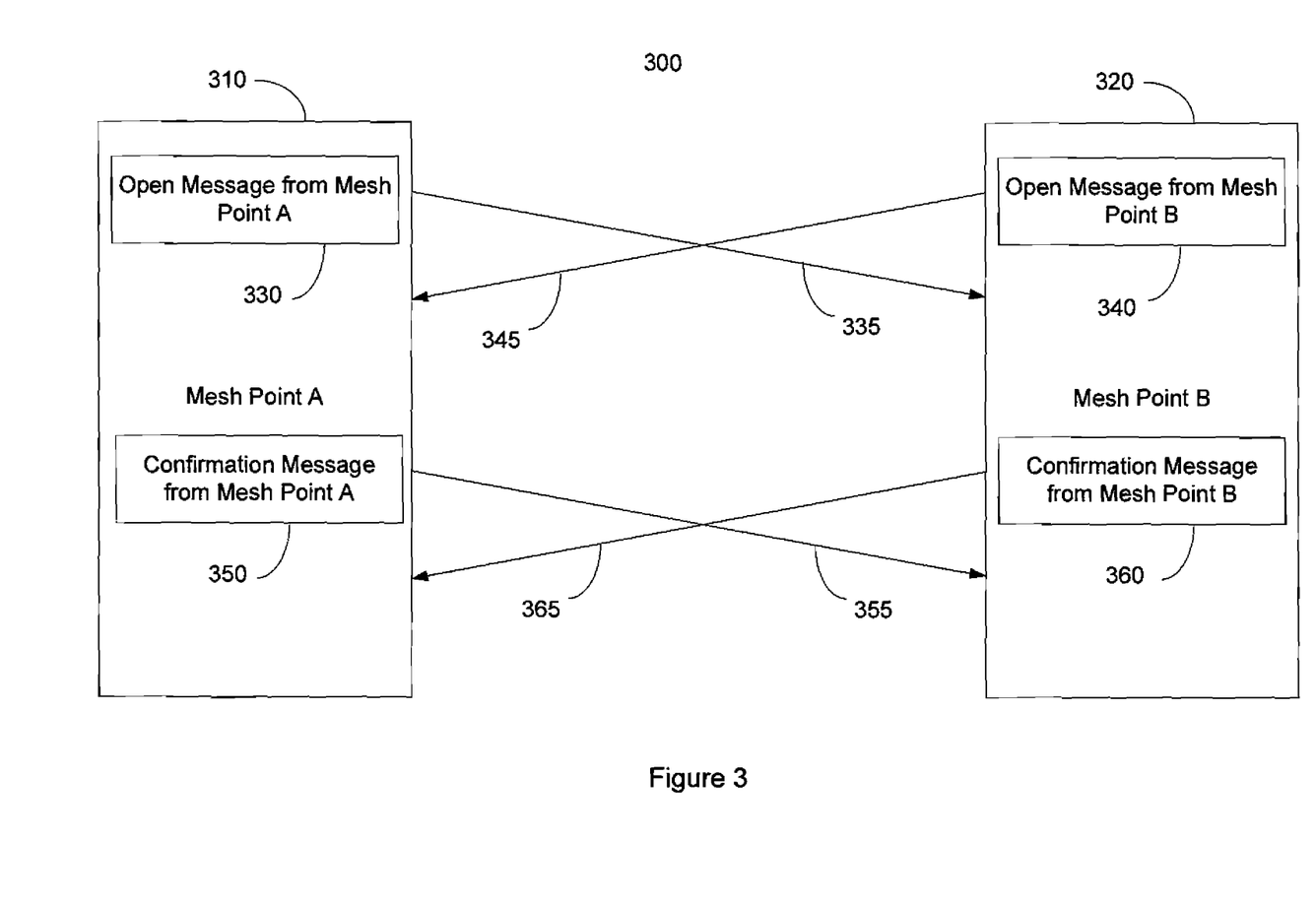
FIG. 3 is an exemplary flow diagram data being exchanged between mesh points according to an embodiment of the invention.

FIG. 3 is a representative block diagram of two mesh points, 310 and 320, exchanging messages in negotiating a PMK according to an embodiment of the invention. Although an embodiment of the invention is described with respect to a wireless ad-hoc network having only two mesh points, the features of this invention is applicable for virtually all designs and configuration of wireless networks having any number of mesh points. The mesh points 310 and 320 of FIG. 3 may be any of the mesh points shown in FIG. 1, and may be represented by the block diagram of the mesh point 200 in FIG. 2. According to an embodiment of the invention, in initiating negotiation of a PMK, at least one mesh point instantiates a new link instance, selects a default PMK and advertises its respective PMK identifier list. The PMK identifier list is an ordered list of the PMKs that two specific mesh points share when they are establishing a connection, and the PMKs are arranged in an order of priority, preferably based on expiration times of the PMKs. The PMKs are unique to each pair of mesh points in a network, and differ for each pair of mesh points attempting to establish a connection. In the current exemplary embodiment, the PMK identifier list includes the PMKs that the mesh points 310 and 320 share and have available to each other when establishing a connection with each other. The default PMK is preferably the PMK of highest priority in the PMK identifier list. In an exemplary embodiment of the invention, the PMK with the highest priority is the PMK with the latest expiration time. After the default PMK is selected the mesh point transmits the PMK identifier list in an open message. The open messages include the PMK identifier lists that are constructed, the authenticated identity of the mesh point, a randomly generated number, the selected default PMK, and an message authentication code for the message computed by the message authentication code key derived from the selected default PMK. Although one embodiment has been described where the default PMK is selected before the PMK identifier list is constructed, in another embodiment, the PMK identifier list may be constructed before the default PMK is selected. The authenticated identity of the mesh point may be the authenticated identity 210 shown in FIG. 2, and the randomly generated number may have been generated by random number generator 220. The message authentication code may be generated according to a cryptographic standard such as the advanced encryption standard ("AES"). In an embodiment of the invention, the open message may be constructed according to the following:

$$MP\|R\|L\|K\|m_{KK}(MP\|R\|L\|K);$$

where MP is the authenticated identity of the transmitting mesh point, R is a random number, L is a list of identifiers of the PMKs available to the mesh point, K is the identifier of the selected default PMK, KK is the message authentication code key derived from K, $m_{KK}(MP\|R\|L\|K)$ is the message authentication code computed using KK, and "||" denotes concatenation. Furthermore, the list of the available PMKs for each mesh point is arranged in a predetermined order. Since each PMK has an associated duration of time for which it is valid, the PMK identifiers in the list of available PMKs L are ordered by the expiration time of each PMK. The first PMK identifier in L identifies the PMK that expires last among all PMKs identified in L and the last PMK identifier in L identifies the PMK that expires first among all PMKs identified in L. The selected default PMK is generally the first PMK identifier in L, the last PMK to expire.

After a mesh point has constructed a PMK identifier list and selected the default PMK, the PMK identifier list is included in an open message and transmitted to other mesh points. In an embodiment where the mesh point 310 is initiating the negotiation of a PMK with the mesh point 320, the mesh point 310 constructs the PMK identifier list, includes the list in the open message 330 and transmits the open message 330 to the mesh point 320, illustrated by the arrow 335. In an embodiment where the mesh point 320 is initiating the negotiation of a PMK, the mesh point 320 constructs the PMK identifier list, includes the list in the open message 340 and transmits the open message 340 to the mesh point 310, illustrated by the arrow 345. In an embodiment where both mesh points 310 and 320 are initiating the negotiation, the open messages 330 and 340 are both constructed and transmitted simultaneously, as shown by arrows 335 and 345.

Each mesh point receives the open message and makes an independent determination regarding the PMK to be used for the current link using an interpretive algorithm, which is based on the default PMKs, and the PMK identifier lists of the mesh points. However, in an embodiment where only one mesh point is initiating the link, this step may precede the formation of a PMK identifier list. For example, in an embodiment where the mesh point 310 is initiating the link with the mesh point 320, the mesh point 310 constructs the PMK identifier list, includes it in the open message 330, and transmits the open message 330 to the mesh point 320. The mesh point 320 receives the open message 330 and makes an independent determination of the PMK to be used for the current link. After the PMK has been chosen, the mesh point 320 constructs a PMK identifier list with the chosen PMK and transmits the PMK identifier list in the open message 340 to the mesh point 310.

After both mesh point have constructed PMK identifier lists, transmitted the lists in open messages, and have each independently chosen the negotiated PMK to be used based on the received open messages, both mesh points compose confirmation messages and transmit the confirmation messages to the other mesh point if the negotiated PMKs are the same. In FIG. 3, the mesh point 310 composes confirmation message 350 and the mesh point 320 composes confirmation message 360. The confirmation message includes the authenticated identities of both mesh points, the random numbers sent by both mesh points in the respective PMK identifier lists, the selected negotiated PMK, and the message authentication code of the confirmation message computed using the negotiated PMK. In an embodiment of the invention, a confirmation message being sent from the mesh point 310 to the mesh point 320 may be composed according to the following:

$$MP310\|MP320\|R_{310}\|R_{320}\|K\|m_{KK}$$
$$(MP310\|MP320\|R_{310}\|R_{320}\|K);$$

where MP310 is the authenticated identity of the mesh point 310, MP320 is the authenticated identity of mesh point 320, $R_{310}$ is the random number generated and transmitted by the mesh point 310 in its open message, $R_{320}$ is the random number generated and transmitted by the mesh point 320 in its open message, K is the selected negotiated PMK, KK is the message authentication code key derived from K, $m_{KK}$ (MP310∥MP320∥$R_{310}$∥$R_{320}$∥K) is the message authentication code computed using KK, and "∥" denotes concatenation. In order to complete the protocol, the mesh point 320 composes and transmits a similar confirmation message to the mesh point 310 to confirm the commitment of both mesh points to use the chosen PMK, designated as K. The corresponding confirmation message composed and transmitted by the mesh point 320 is as follows:

$$MP320\|MP310\|R_{320}\|R_{310}\|K\|m_{KK}$$
$$(MP320\|MP310\|R_{320}\|R_{310}\|K);$$

where MP320 is the authenticated identity of the mesh point 320, MP310 is the authenticated identity of mesh point 310, $R_{320}$ is the random number generated and transmitted by the mesh point 320 in its open message, $R_{310}$ is the random number generated and transmitted by the mesh point 310 in its open message, K is the selected negotiated PMK, KK is the message authentication code key derived from K, $m_{KK}$ (MP320∥MP310∥$R_{320}$∥$R_{310}$∥K) is the authentication code computed using KK, and "∥" denotes concatenation. The inclusion of the two random numbers in the confirmation message protect against replay attacks and confirm to both mesh points that the messages are fresh. The transmission of the two confirmation messages 350 and 360 is represented by the two arrows 355 and 365. However, if no PMK has been successfully negotiated, no confirmations messages are composed or transmitted.

Figure 4:
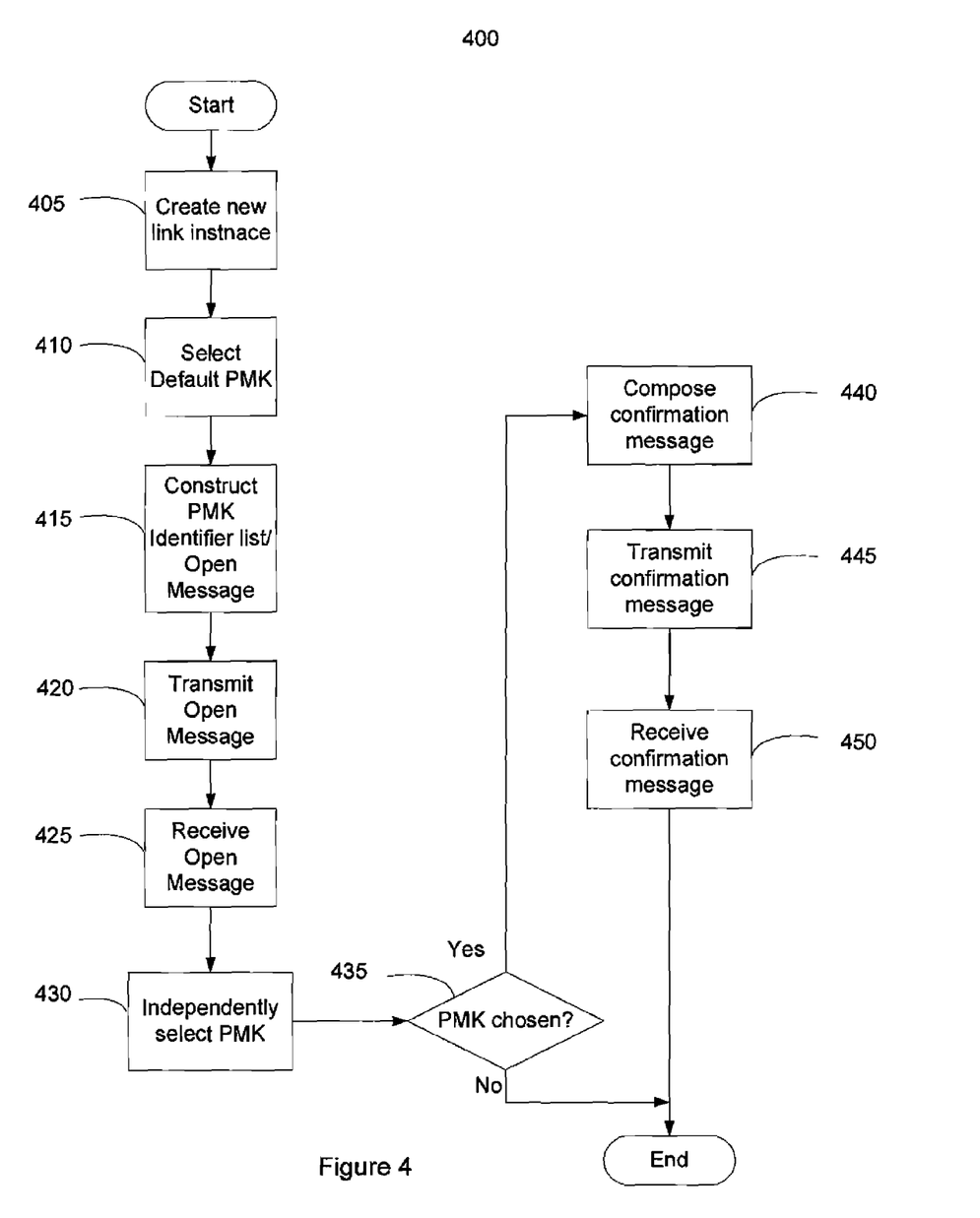
FIG. 4 is an exemplary flow diagram of negotiating a pairwise master key ("PMK") according to an embodiment of the invention.

FIG. 4 is a representative flow diagram of a method 400 according to an embodiment of the invention that show the steps of the interpretive algorithm performed at a mesh point in independently selecting a negotiated PMK. The steps of the method 400 are described with respect to elements and features of the wireless ad-hoc network 100 and the mesh point 310, shown in FIGS. 1 and 3, respectively. However, the steps of the method 400 are not confined to the embodiment of the invention described.

The first step of the method 400 is step 405, where the mesh point 310 is attempting to establish a link, and thus needs to negotiate a PMK. In preparation for establishing a link, the mesh point 310 creates a new instance for a new link during step 405. In step 410, the mesh point 310 selects a default PMK from the list of PMKs that it has available. The available PMKs may be sorted in order of expiration times, with the PMK with the latest expiration time given the highest priority, and the PMK expiring closest in time ranked last. Preferably, the default PMK is the PMK with the highest priority (i.e.— the PMK that expires last). After the default PMK is chosen, the mesh point 310 constructs a PMK identifier list to be placed in an open message as described above during step 415. The mesh point 310 then transmits the open message to another mesh point in the network 100 during step 420. After the open message is transmitted in step 420, the mesh point 310 may receive an open message from another mesh point in the network 100 during step 425. The other mesh point may be the mesh point 320 as shown in FIG. 3.

After receiving the open message from another mesh point, the mesh point 310 independently selects a negotiated PMK based on the PMKs that it has available and the received open message. If no PMK can be selected during step 430, the mesh point 310 terminates the current instance for a link and begins the method 400 again. However, if a PMK is selected during step 430, the mesh point 310 composes a confirmation message as described above during step 440. The mesh point 310 then transmits the confirmation message during step 445, and receives a confirmation message from another mesh point during step 450. If the chosen PMKs match, the protocol ends and a link is successfully established.

Figure 5:
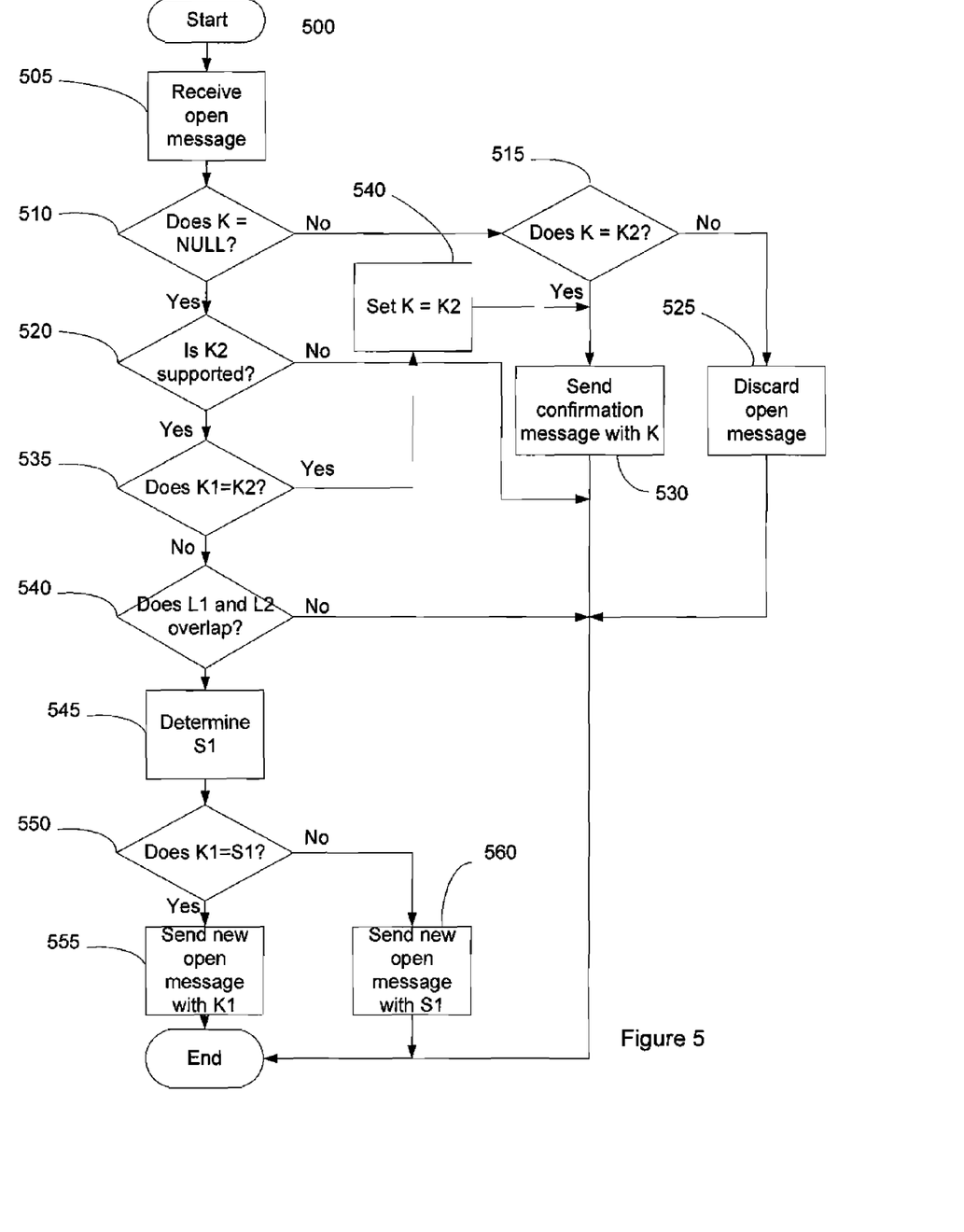
FIG. 5 is an exemplary flow diagram of negotiating a pairwise master key ("PMK") according to an embodiment of the invention.

FIG. 5 is an exemplary flow diagram of a method 500 according to an embodiment of the invention that may be performed by at a mesh point, such as the mesh point 310, during the step 430 of the method 400 in independently selecting a PMK. The method 500 may be performed at the mesh point 310 when it is attempting to establish a link, or when it has received an open message from another mesh point attempting to establish a link. The steps of the method 500 are described with respect to elements and features of the wireless ad-hoc network 100 and the mesh point 310 shown in FIGS. 1 and 3. However, the steps of the method 500 are not confined to the embodiment of the invention described. During the description of the method 500, K represents the variable of the PMK being used by the mesh point, K2 represents the PMK that is received in the open message received during step 505, L1 represents the list of PMKs available to the mesh point 310, and L2 represents the list of PMKs available to the mesh point that transmitted the open message received at the mesh point 310 during step 505.

During step 505, the mesh point 310 receives an open message from another mesh point in the wireless ad-hoc network. During decision block 510, the mesh point 310 determines whether it already has a PMK to be used (K). If it determines that a PMK to be used has already been established, it checks to see if the PMK to be used is the same as K2 that was included in the received open message during step 515. If the two PMKs match, the mesh point 310 composes and transmits a confirmation message with the selected PMK (K2) during step 530. If the two PMKs do not match, the open message is discarded during step 525 and the method is ended.

In the situation that the mesh point 310 does not have a PMK to be used, the mesh point 310 verifies whether K2 is included in its list of available PMKs (L1) during decision block 520. If K2 is not included in L1, the open message is discarded, and the method is ended. However, if K2 is present in L1, the mesh point 310 checks to see if K2 is the same PMK as the PMK with the highest priority (K1, the PMK with the latest expiration time) in its list L1 during step 535. If K1 and K2 are the same, the mesh point sets K2 as the PMK to be used during step 540, and accordingly composes and sends a confirmation message. However, if K1 and K2 are not the same, the mesh point 310 looks to see if there are any shared PMKs in L1 and L2. If no shared PMKs exist, the protocol is ended. If at least one common PMK exists, the mesh point 310 determines which PMK has the highest priority (latest expiration time) of the shared PMKs (S1) during step 545. Next, the mesh point 310 checks to see if S1 and K1 are the same during step 550. If S1 and K1 are the same, the mesh point 310 constructs an open message using K1, and sends the list in a corresponding open message. However, if S1 and K1 are not the same, the mesh point discards the current link instance, and constructs a new open message with S1 to transmit to the mesh point 320. Thus, if a PMK is successfully negotiated with the method 500, the resulting negotiated PMK is the PMK with the highest priority among the PMKs shared by the two mesh points.

Figure 6:
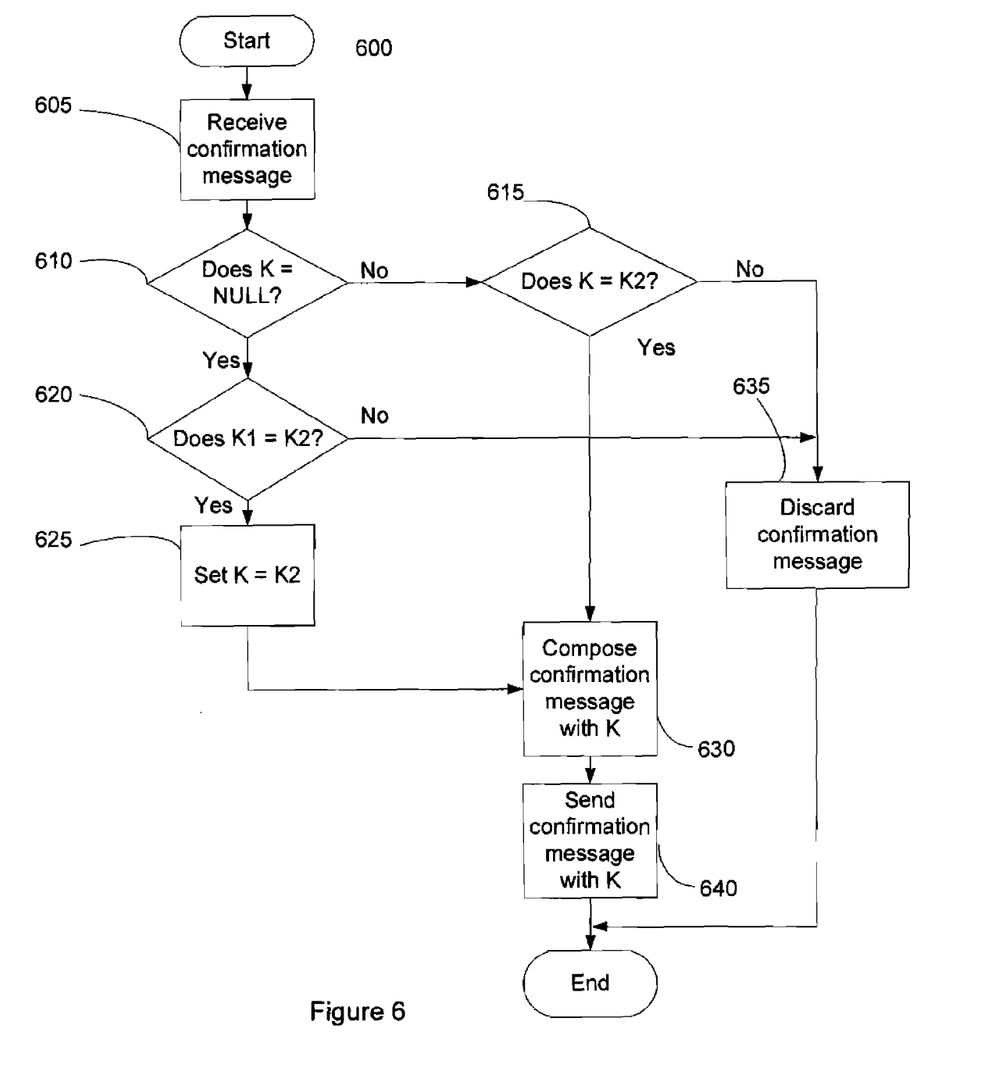
FIG. 6 is an exemplary flow diagram of finalizing the negotiation of a pairwise master key according to an embodiment of the invention.

FIG. 6 is an exemplary flow diagram of a method 600 according to an embodiment of the invention that may be performed by at a mesh point, such as the mesh point 310, during the step 450 of the method 400 when it has received a confirmation message in order to in finalize the negotiated PMK. The steps of the method 600 are described with respect to elements and features of the wireless ad-hoc network 100 and the mesh point 310 shown in FIGS. 1 and 3. However, the steps of the method 600 are not confined to the embodiment of the invention described.

During step 605, the mesh point 310 receives a confirmation message. At decision block 610, the mesh point 310 determines whether it already has a PMK that is being used (K). If a PMK being used has been established, the mesh point 310 checks to see if the PMK being used is the same as the PMK received in the confirmation message (K2) during step 615. If the two PMKs are the same, the mesh point 310 verifies the authentication code included in the confirmation message. Afterwards, the mesh point 310 composes and sends a corresponding confirmation message during steps 630 and 640 and ends the method. If the two PMKs are not the same, the mesh point 310 discards the confirmation message and ends the method.

However, in the situations where the PMK does not have PMK that has been established (K), the mesh point checks to see if K2 is the same PMK as the PMK in its list of available PMKs with the highest priority (K1) based on expiration time during step 620. If K1 and K2 are the same, the mesh point sets K2 as its PMK to be used during step 625, and composes and sends a corresponding confirmation message during steps 630 and 640.

Thus, while there have been shown, described, and pointed out fundamental novel features of the invention as applied to several embodiments, it will be understood that various omissions, substitutions, and changes in the form and details of the illustrated embodiments, and in their operation, may be made by those skilled in the art without departing from the spirit and scope of the invention. Substitutions of elements from one embodiment to another are also filly intended and contemplated. The invention is defined solely with regard to the claims appended hereto, and equivalents of the recitations therein.

We claim:

1. A system for negotiating a pairwise master key ("PMK"), comprising at least a first network device and a second network device, wherein the first network device is configured to independently select a first default PMK from an ordered PMK identifier list before the PMK has been negotiated, construct a first PMK identifier list comprising the ordered PMK identifier list, compose a first open message comprising the first PMK identifier list, transmit the first open message to the second network device, and receive a second open message comprising a second default PMK and a second PMK identifier list constructed by the second network device, and negotiate the PMK based on the first default PMK, the first PMK identifier list, and the second PMK identifier list,     wherein the ordered PMK identifier list includes one or more PMKs ordered in accordance with at least an expiration time of each of the one or more PMKs, and wherein the first network device and the second network device are mesh points in a wireless ad-hoc network, wherein the first network device comprises a processor, a storage device, and a communication device configured to transmit and receive data.

2. The system as in claim 1, wherein the first open message comprises:

a first network device identifier associated with the first network device;
    a generated random number associated with the first network device;
    the first PMK identifier list comprising a list of PMKs associated with the first network device and the second network device;
    the first default PMK associated with the first network device; and
    a message authentication code constructed with the first default PMK.

3. The system as in claim 1, wherein the second open message comprises:

a second network device identifier associated with the second network device;
    a generated random number associated with the second network device;
    the second PMK identifier list comprising a list of PMKs associated with the first network device and the second network device;
    the second default PMK associated with the second network device; and
    a message authentication code constructed with the second default PMK.

4. The system as in claim 1, wherein the first PMK identifier list and the second PMK identifier lists are arranged in an order of priority based on expiration times associated with at least one of the PMKs in each of the lists and the first default PMK is a PMK in the first PMK identifier list with a highest priority in the first PMK identifier list and the second default PMK is a PMK in the second PMK identifier list with a highest priority in the second PMK identifier list.

5. The system as in claim 4, wherein a highest priority in the order of priority is given to the PMK that expires latest.

6. The system as in claim 1, wherein the negotiated PMK comprises a PMK with a highest priority of PMKs shared by both the first network device and the second network device.

7. The system as in claim 1, wherein the first network device and the second network device are further configured to transmit a first confirmation message and a second confirmation message upon successful negotiation of the PMK, wherein successful negotiation comprises the first default PMK and the second default PMK being the same PMK, the first confirmation message and the second confirmation message each comprising:

a first network device identifier associated with the first network device;
    a second network device identifier associated with the second network device;
    a first randomly generated number associated with the first network device;
    a second randomly generated number associated with the second network;
    the negotiated PMK; and
    a message authentication code constructed with the negotiated PMK.

8. The system of claim 1, wherein the one or more PMKs in the ordered PMK identifier list are unique to the first network device and the second network device.

9. The system of claim 8, wherein each pair of network devices in the wireless ad-hoc network attempting to establish a connection is associated with a unique set of PMKs which differs from a set of PMKs associated with any other pair of network devices in the wireless ad-hoc network attempting to establish a connection.

10. A method for negotiating a pairwise master key ("PMK"), comprising:

independently selecting a first default PMK from an ordered PMK identifier list before the PMK has been negotiated for at least a first network device and a second network device, wherein the ordered PMK identifier list includes one or more PMKs ordered in accordance with at least an expiration time of each of the one or more PMKs;

constructing, at the first network device, a first PMK identifier list comprising the ordered PMK identifier list;

transmitting a first open message comprising the first PMK identifier list to the second network device;

receiving a second open message comprising the second PMK identifier list associated with the second network device; and negotiating the PMK based on the first default PMK, the ordered PMK identifier list, and the second PMK identifier list, wherein the first network device and the second network device are mesh points of a wireless ad-hoc network.

11. The method as in claim 10, further comprising:
constructing the second PMK identifier list associated with the second network device and the first network device at the second network device;
determining a second default PMK associated with the second network device;
transmitting the second open message comprising the second PMK identifier list to the first network device;
receiving the first open message comprising the PMK identifier list transmitted by the first network device; and
independently selecting the negotiated PMK based on the received first PMK identifier list, the second default PMK, and the second PMK identifier list.

12. The method as in claim 11, further comprising:
successfully negotiating the PMK, wherein successful negotiation comprises the first default PMK being the same as the second default PMK;
composing a first confirmation message based on the negotiated PMK at the first network device;
transmitting the first confirmation message to the second network device; and
receiving a second confirmation PMK message based on the negotiated PMK from the second network device.

13. The method as in claim 12, further comprising:
successfully negotiating the PMK, wherein successful negotiation comprises the first default PMK being the same as the second default PMK;
composing the second confirmation message based on the negotiated PMK at the second network device;
transmitting the second confirmation message to the first network device; and
receiving the first confirmation message based on the negotiated PMK from the first network device.

14. The method as in claim 13, wherein the first confirmation message and the second confirmation message comprise:
a first network device identifier associated with the first network device;
a second network device identifier associated with the second network device;
a first randomly generated number associated with the first network device;
a second randomly generated number associated with the second network;
the negotiated PMK; and
a message authentication code constructed with the negotiated PMK.

15. The method as in claim 11, wherein the second open message comprises:
a second network device identifier associated with the second network device;
a generated random number associated with the second network device;
the second PMK identifier list comprising a list of PMKs associated with the first network device and the second network device;
the second default PMK associated with the second network device; and
a message authentication code constructed with the second default PMK.

16. The method as in claim 11, wherein the first PMK identifier list and the second PMK identifier lists are arranged in an order of priority based on expiration times associated with at least one of the PMKs in each of the lists, and the first default PMK is a PMK in the first PMK identifier list with a highest priority in the first PMK identifier list and the second default PMK is a PMK in the second PMK identifier list with the highest priority in the second PMK identifier list.

17. The method as in claim 16, wherein a highest priority in the order of priority is given to the PMK that expires latest.

18. The method as in claim 10, wherein the first open message comprises:
a first network device identifier associated with the first network device;
a generated random number associated with the first network device;
the first PMK identifier list comprising a list of PMKs associated with the first network device and the second network device;
the first default PMK associated with the first network device; and
a message authentication code constructed with the first default PMK.

19. The method as in claim 10, wherein the negotiated PMK comprises a PMK with a highest priority of PMKs shared by both the first network device and the second network device.

20. The method of claim 10, wherein the one or more PMKs in the ordered PMK identifier list are unique to the first network device and the second network device.

21. The method of claim 20, wherein each pair of network devices in the wireless ad-hoc network attempting to establish a connection is associated with a unique set of PMKs which differs from a set of PMKs associated with any other pair of network devices in the wireless ad-hoc network attempting to establish a connection.

* * * * *